(No Model.) 2 Sheets—Sheet 1.
O. S. STURTEVANT & J. F. CLARK.
TOOL FEEDING DEVICE FOR SHAPING MACHINES.
No. 420,746. Patented Feb. 4, 1890.
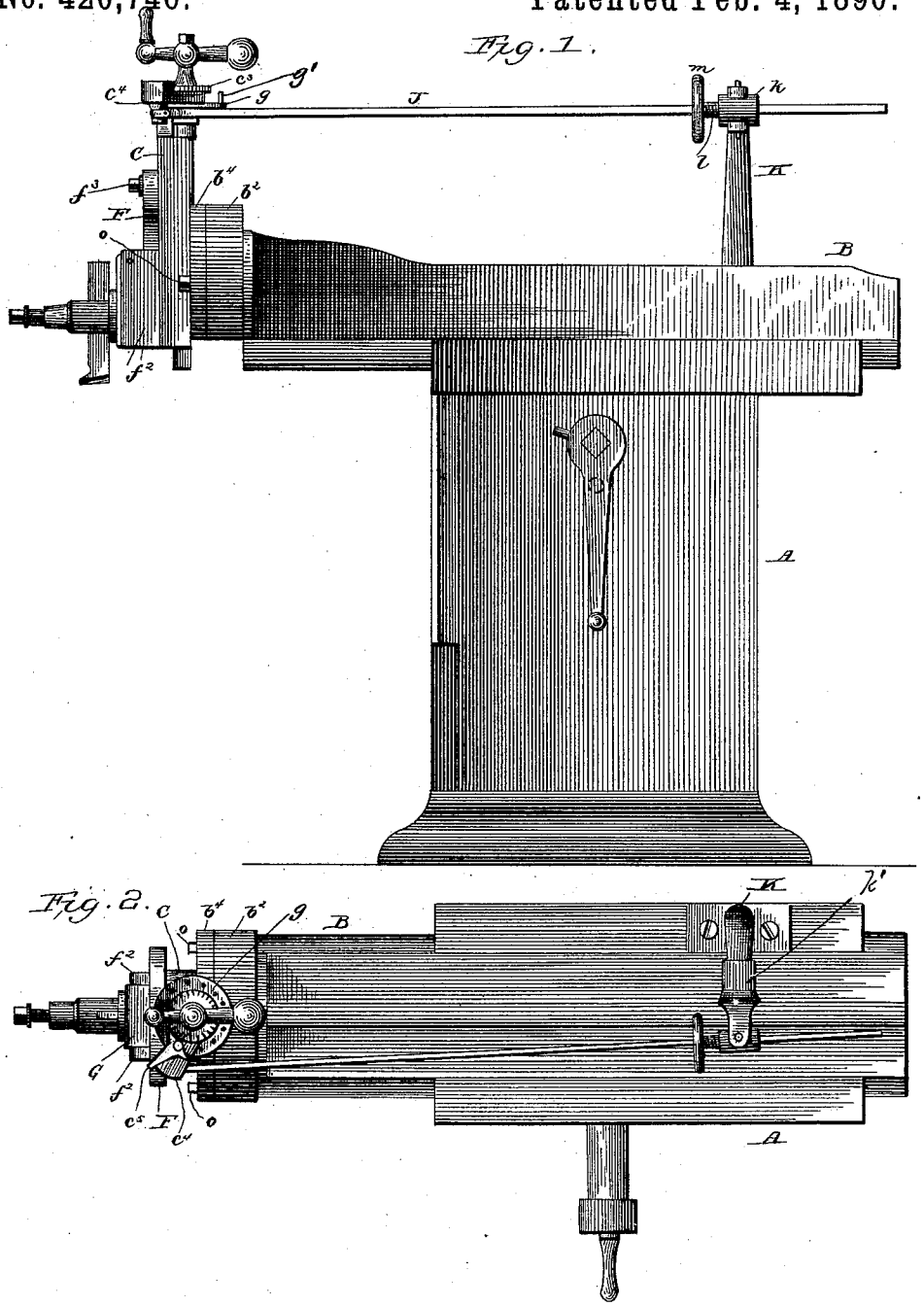
WITNESSES
Edwin I. Yewell
D. B. Gallatin
INVENTORS
O. S. Sturtevant
J. F. Clark
By Ginsabaugh
Attorney (No Model.) 2 Sheets—Sheet 2.
O. S. STURTEVANT & J. F. CLARK.
TOOL FEEDING DEVICE FOR SHAPING MACHINES.
No. 420,746. Patented Feb. 4, 1890.
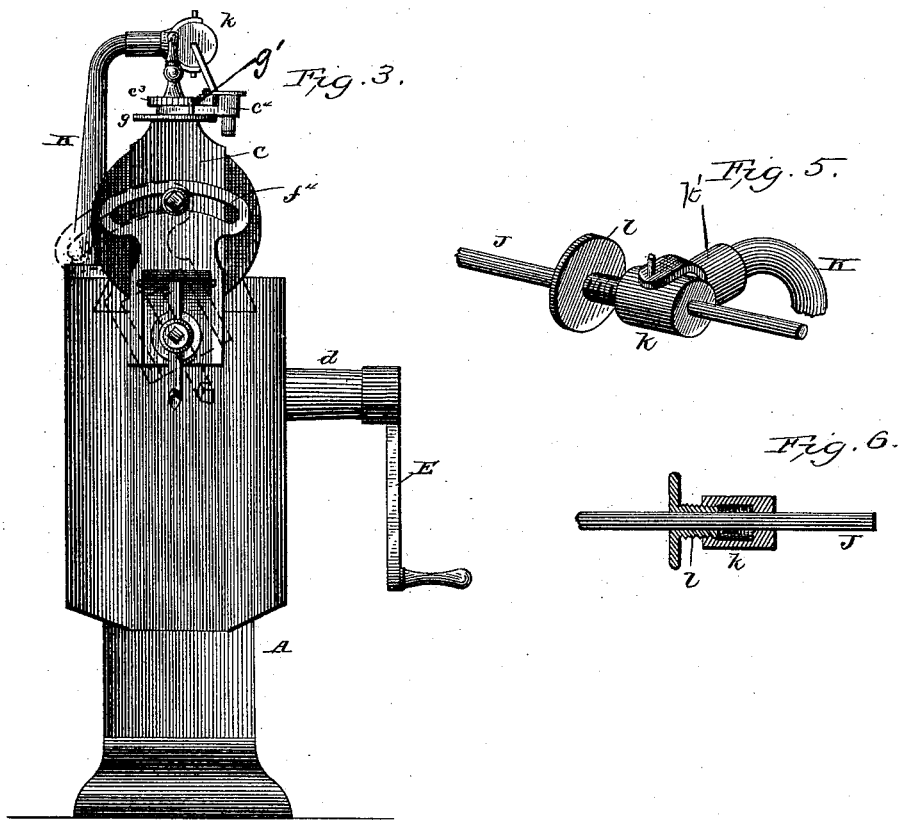
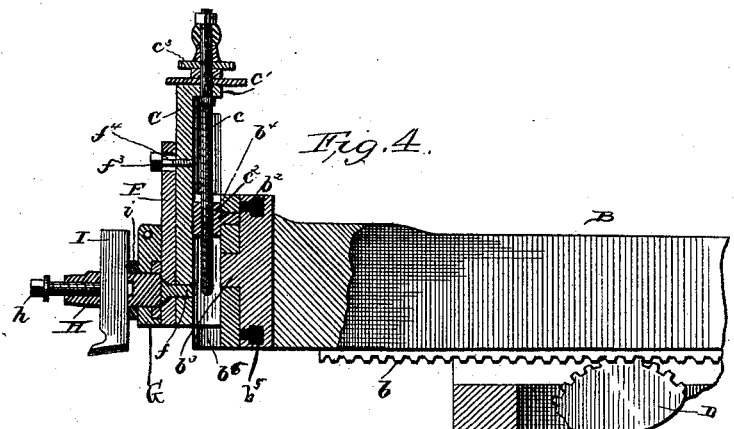
WITNESSES
Edwin L. Yewell
D. P. Gallaher
INVENTORS
O. S. Sturtevant
J. F. Clark
By S. W. Ginsabaugh
Attorney

UNITED STATES PATENT OFFICE.

ORANGE S. STURTEVANT AND JAMES F. CLARK, OF MORENCI, MICHIGAN.

TOOL-FEEDING DEVICE FOR SHAPING-MACHINES.

SPECIFICATION forming part of Letters Patent No. 420,746, dated February 4, 1890.

Application filed December 14, 1888. Serial No. 293,627. (No model.)

*To all whom it may concern:*

Be it known that we, ORANGE S. STURTEVANT and JAMES F. CLARK, of Morenci, in the county of Lenawee and State of Michigan, have invented certain new and useful Improvements in Friction-Feed for Shaping-Machines, of which the following, taken in connection with the accompanying drawings, is a specification.

Our invention relates to that class of metal-working machines known as "shapers;" and it consists, essentially, in an automatic feed mechanism operated by friction to feed the tool or cutter up or down, as may be desired.

The object is to provide a simple and reliable feed, which shall be applicable to all machines of the class for which it is designed.

In the accompanying drawings, which form a part of this specification, Figure 1 is a side elevation, Fig. 2 a top plan, Fig. 3 a front elevation, and Fig. 4 a longitudinal sectional elevation, of a machine embodying our invention. Fig. 5 is a perspective of the friction device for operating the feed, and Fig. 6 is a sectional view of the same.

A designates the body or frame of the machine, which is provided at its top with a dovetail seat or guideway in which reciprocates the carriage B, which is provided with a corresponding dovetail base, as usual in this class of machines. The carriage is reciprocated by any suitable means, a gear-wheel D being shown, which is journaled in the body or frame A, and engages a rack $b$ on the under side of the carriage. E is a crank on the shaft $d$ of the gear-wheel D; but in actual use a gear-wheel or pulley to which power is applied will be substituted for the crank, the latter being shown merely for the purpose of indicating the operation of the machine.

At the front end the carriage has a circular head $b^2$, which carries the tool-holder and the feeding mechanism, the construction and arrangement of which are as follows: Projecting from the face of the head $b^2$ is a central stud $b^3$, upon which is mounted a circular plate $b^4$, so as to be capable of turning thereon for purposes of adjustment. This plate is clamped to the head by clamping-bolts $o$, whose heads set in a circular undercut groove $b^5$ in the face of the head and project through the plate, having nuts on their outer ends by which the parts are clamped together. Upon the face of the plate $b^4$, and running vertically across the same, is a dovetail rib or guide $b^6$, to which is fitted, so as to slide thereon, a tool-block C. In the face of the dovetail rib $b^6$ is a channel to receive a screw $c$, which is swiveled in a horizontal lug or flange $c'$, projecting backward from the upper end of block C. This screw $c$ works through a nut $c^2$, affixed to the plate $b^4$ within the channel of the dovetail rib or guide $b^6$, so that when the screw is turned the plate will be moved up or down according to the direction in which the screw is turned.

F is a plate, which is pivoted to the block C by a pivot $f$ at its lower end, its upper end being held by clamping-screw $f^3$, which passes through a segmental slot $f^4$ and screws into the plate. The plate F is capable of angular adjustment, as indicated in broken lines in Fig. 3.

G designates a flap-plate, which is hinged or pivoted between forwardly-projecting ears $f^2 f^2$ on the plate F. At its lower end the plate carries the tool-holding spindle H, which is a cylindrical body with a head at its inner end, the body passing through an opening in plate G, and the head being seated in a recess in the back side thereof, as indicated in Fig. 4. This spindle is slotted to receive the tool or cutter I and has a clamping-screw $h$ in its outer end to clamp and hold the cutter. The spindle is capable of being turned in its seat in plate G, so that the tool may be angularly adjusted.

Between the tool I and the plate G is a washer $i$. The tool being set as desired, the screw $h$ is set up and the parts are securely clamped and held in adjustable position.

The feed mechanism for turning the screw $c$, and thereby feeding the cutter up or down, and which constitutes the essential feature of our invention, will now be described.

On the shank of the screw $c$, above the block C and rigidly affixed thereto, is a ratchet-wheel $c^3$, and immediately below the latter is a lever $c^4$, which is loosely connected, so as to turn on said shank. At its outer end the lever carries a double pawl $c^5$, which is capable of having either of its arms thrown into engagement with the wheel and of being thrown out of action altogether, and which is held in adjusted position by a spring (not shown) in the usual manner.

$g$ is a plate rigidly mounted on the top of the tool-block C and provided with pins $g'$, which limit the movement of the lever $c^4$. The plate has a number of holes, and the pins may be moved from one to the other to regulate the movement of the lever, and thereby adjust the rate of feed. To the outer end of the lever $c^4$ is connected the end of a rod J, the opposite end of which passes through a friction device supported on a standard K, which rises from the top of the machine. This friction device consists of a barrel $k$, which is trunnioned in the fork of a head $k'$ on the standard K, the said head being swiveled on the end of the standard, whereby the barrel is adapted to be turned in both horizontal and vertical planes to adjust itself to the direction of the rod K. The interior cavity of the barrel is larger than the rod, so as to leave a space around the latter, (see Fig. 6,) and this space is designed to be packed with any suitable substance or material capable of being compressed so as to apply friction to the rod, such compression being effected by screw $l$, which screws into the open end of the barrel, as shown in Figs. 5 and 6, and is provided with an enlarged head $m$, by which it is turned.

The operation of this friction device is as follows: The machine being in operation and the carriage B traveling back and forth, the screw $l$ is screwed into the barrel K to compress the packing contained therein sufficiently to apply friction to the rod J to hold the latter at the beginning of each movement of the carriage until the lever $c^4$ is turned to the limit of its movement, whereby the screw $c$ is turned and the feed-block and its attached parts are fed up or down, according to the direction in which pawl $c^5$ is set to act. When a channel is to be cut in an inclined direction, the clamping-bolts $o$ are loosened and the plate $b^4$ is turned to the desired angle and again clamped.

When it is desired to set the tool at an angle to the line of feed, the clamping-bolt $f^3$ is loosened and the plate F is turned to the desired angle, as indicated in broken lines in Fig. 3, and again secured in that position.

What we claim, and desire to secure by Letters Patent, is—

In a machine for shaping metal having a reciprocating carriage provided with a tool-holder and feed-screw therefor, the actuating mechanism for said screw, comprising the friction device and the rod reciprocating through said friction device, and connected, substantially as described, to said feed-screw, as and for the purpose set forth.

In testimony whereof we have signed our names to this specification, in the presence of two subscribing witnesses, on this 29th day of November, A. D. 1888.

ORANGE S. STURTEVANT.
JAS. F. CLARK.

Witnesses:
D. A. DOWNER,
L. W. SINSABAUGH.